United States Patent [19]

Stenger et al.

[11] 4,070,826

[45] Jan. 31, 1978

[54] LOW PRESSURE FUEL INJECTION SYSTEM

[75] Inventors: Richard E. Stenger; Edward E. Ekstedt, both of Cincinnati; John M. Richey, Fairfield; Stanford P. Seto, Loveland, all of Ohio

[73] Assignee: General Electric Company, Cincinnati, Ohio

[21] Appl. No.: 644,040

[22] Filed: Dec. 24, 1975

[51] Int. Cl.² .......................... F02C 7/22; B05B 7/32
[52] U.S. Cl. ............................. 60/39.66; 60/39.74 R; 239/425; 239/426; 239/434
[58] Field of Search ........ 60/39.71, 39.74 B, 39.74 R, 60/39.66, 39.32; 239/426, 434, 425, 424, 424.5

[56] References Cited

U.S. PATENT DOCUMENTS

| | | | |
|---|---|---|---|
| 2,483,951 | 10/1949 | Watson | 60/39.74 R |
| 2,494,659 | 1/1950 | Huyton | 60/39.32 |
| 2,551,538 | 5/1951 | Hensel | 239/424 |
| 2,982,099 | 5/1961 | Carlisle et al. | 60/39.74 R |
| 3,028,102 | 4/1962 | Davies et al. | 239/44 |
| 3,452,933 | 7/1969 | Hakluytt | 239/399 |
| 3,735,930 | 5/1973 | Mori | 60/39.74 R |
| 3,764,071 | 10/1973 | Carlisle | 60/39.74 B |
| 3,869,865 | 3/1975 | Lacroix et al. | 60/39.66 |
| 3,938,324 | 2/1976 | Hammond et al. | 60/39.74 R |

FOREIGN PATENT DOCUMENTS 1,460,927  10/1966  France ................... 239/424

Primary Examiner—Robert E. Garrett
Attorney, Agent, or Firm—Dana F. Bigelow; Derek P. Lawrence

[57] ABSTRACT

A low pressure fuel stream is injected into a carburetor by way of a fuel tube injector combination having an insulating air space provided between the internal flow path structure and the outer surface of the combination which is exposed to relatively high temperatures. The fluid stream is thus maintained at a relatively low temperature and pressure until it is discharged from the fuel injector, at which time a surrounding airstream prevents the direct contact of the fuel flow with the surface of the fuel injector, and therefore prevents any carbon build-up which would otherwise occur on or near the fuel exit orifice.

14 Claims, 10 Drawing Figures

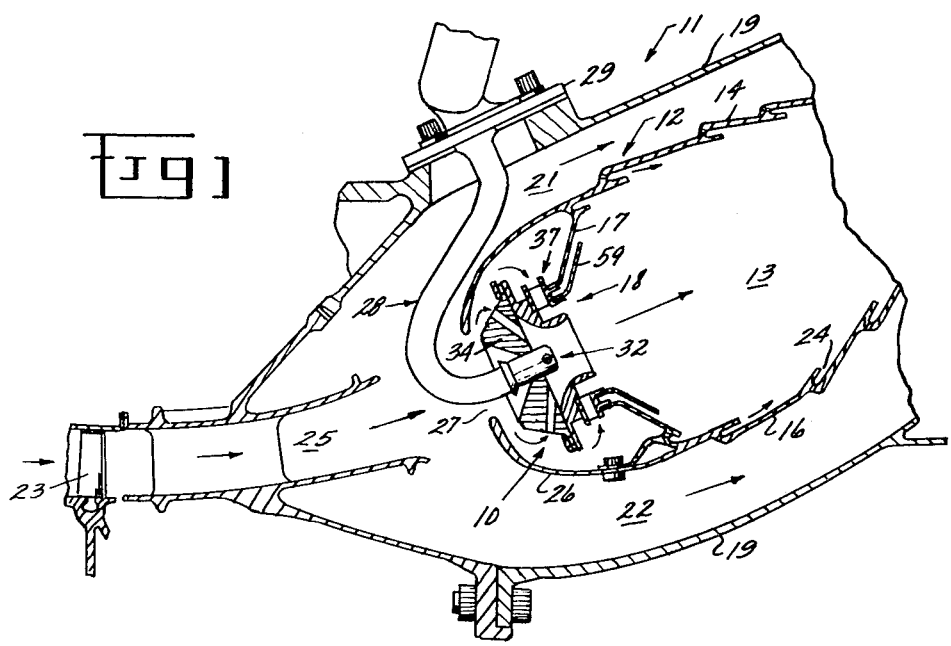
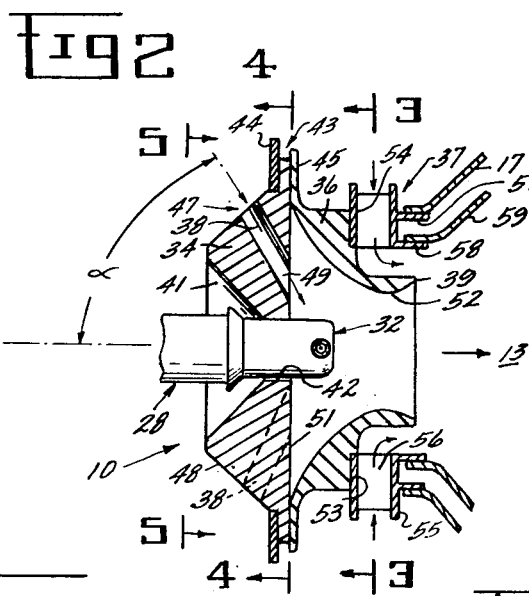
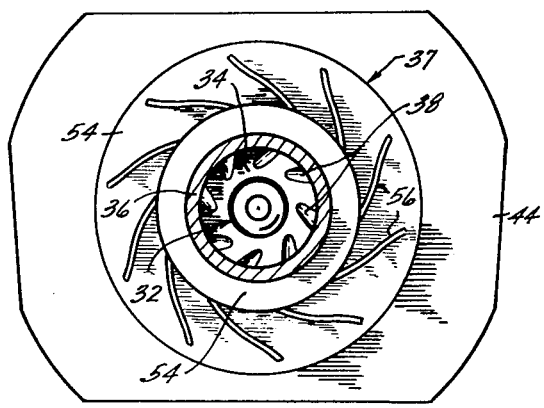
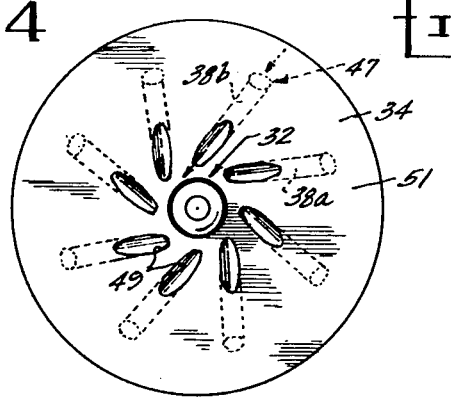
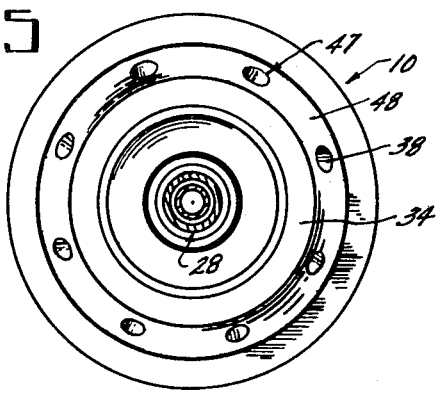

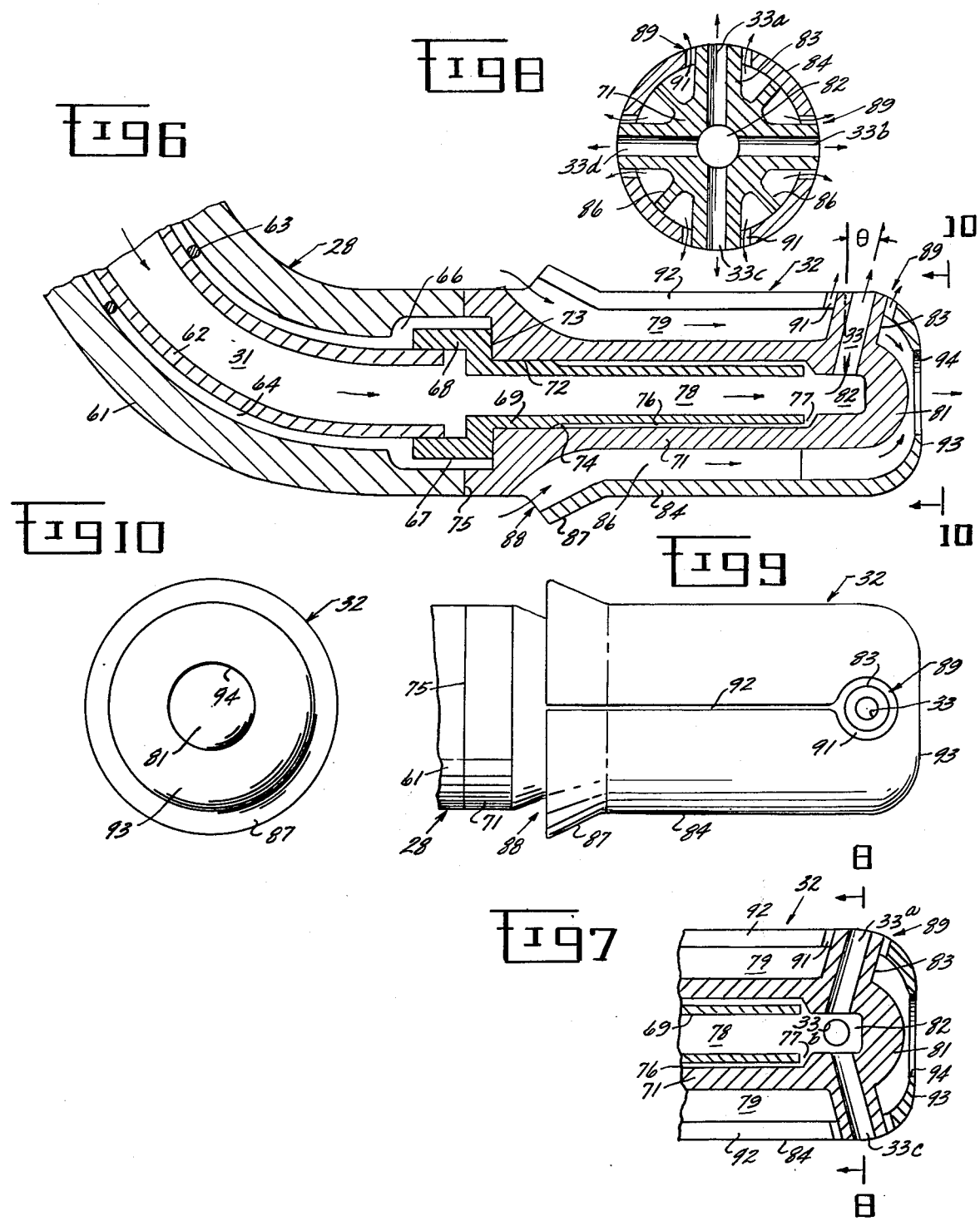

LOW PRESSURE FUEL INJECTION SYSTEM

BACKGROUND OF THE INVENTION

This invention relates generally to fuel delivery systems and more particularly, to low pressure fuel injectors for gas turbine engine combustion systems.

The invention described herein was made in the course of or under a contract, or a subcontract thereunder, with the United States Department of the Air Force.

Gas turbine engine manufacturers are constantly striving for a carburetor design which will provide a fuel/air mixture to a continuous-flow combustion chamber for the achievement of complete and efficient combustion of the fuel by minimizing the occurrence of fuel-rich pockets which, upon combustion, may produce carbon or smoke. Various prior art methods have proven to be unsatisfactory for one reason or another. For example, high pressure fuel spray atomizers have not proven entirely satisfactory because of the requirements for many intricate parts including two concentric pressure atomizing nozzles and associated internal seals. Further, there is a need for high pressure fuel pumps and very small flow passages which result in high velocities and erosions. Systems for vaporizing the fuel upon injection into the combustor have also proven to be severely limited due to the dependence of the vaporization process on the temperature of the fuel and air entering the combustor.

One of the more successful alternatives for obtaining the desired performance characteristics as mentioned hereinabove, is the low pressure fuel injection system having counterrotational primary and secondary swirl vanes which efficiently atomize the fuel by the high shear forces developed at the confluence of the counterrotational airstreams. The most common counterrotational system employs, in the primary stage, an axial swirler where the air enters in an axial direction, is deflected in a somewhat circumferential direction to introduce a swirl to the airflow, and then flows axially downstream in the venturi where it finally mixes and interacts with the air from the counterrotational secondary swirler. One disadvantage of such a system is that, due to the relatively low velocity air introduced at the root of the axial swirler, a deposit of carbon is likely to be formed on the fuel injector which, in turn, may effect the flow of fuel and thereby the efficieny of the overall system. Another factor which tends to contribute to the problem is that of the high temperature condition within the area of the injector nozzle. Since the injector nozzle is in the closest vicinity of the combustion chamber, it tends to be heated up to a relatively high temperature, and when the fuel stream is discharged to the hot outer periphery of the nozzle, there is a tendency for the carbon to form on the surface thereof. Such a carbon formation may eventually build up and finally plug the injector to cause a serious malfunction of the system.

Since it is necessary to have the differential temperature between the internal fuel carrying portion of the injector nozzle and the outer structure thereof, which is necessarily exposed to the heat from the combustion zone and from the compressor discharge air, there is a problem of a differential thermal growth which tends to impose stress and may cause cracking, reduced fatigue life, and air shroud loss. Further, it is difficult to incorporate any kind of external sheet metal shield on the injector body without incurring difficulties associated with the loosening or failing of the shield structure. Finally, it must be kept in mind that since the injector structure is placed between the air supply stream and the combustor, it is desirable to minimize the air blockage and combustor penetration diameter.

Accordingly, a primary objective of this invention is to provide an improved fuel injector for introducing a fuel/air mixture into a combustion chamber for efficient and low smoke combustion of the fuel.

Another object of this invention is the provision for the delivery of fuel to the carburetor by a low pressure fuel system which does not allow the formation of carbon on the fuel injector.

Yet another object of this invention is the provision in a fuel injector nozzle for maintaining a differential temperature between the inner fuel carrying portion and the outer exposed portion thereof.

A further object of this invention is the provision for a low pressure fuel injector nozzle system which provides a minimum air blockage and combustor penetration diameter.

These objects and other features and advantages become more readily apparent upon reference to the following description when taken in conjunction with the appended drawings.

SUMMARY OF THE INVENTION

Briefly, in accordance with one aspect of the invention, a fuel tube/fuel injector nozzle combination is provided with an airspace along its axial length, between the internal fuel-carrying portions and the external high temperature exposed portion thereof, to limit the temperature of the fuel to thereby prevent its carbonization prior to its reaching the airstream for its carburetion. Further, the inner fuel-carrying tube has no structural requirements and the structural outer tube is shielded from the low temperature fuel so as to reduce the differential temperature between the inner and outer surfaces thereof to reduce thermal stress.

By another aspect of this invention, a shroud is constructed around the body of a fuel injector nozzle so as to define an airflow channel between the two elements for insulating the central body from the relatively high temperature shroud. The shroud has a plurality of longitudinal slits formed therein to allow for the thermal expansion thereof at a rate which is more rapid than that of the central body which is rigidly attached thereto.

By yet another aspect of this invention the main fuel-carrying body in the nozzle has a plurality of nozzle ports extending therefrom to carry the liquid fuel to the outer periphery of the shroud. in order to accommodate these, the shroud has, in connection with each of the nozzle ports, a hole formed therein through which the nozzle port projects so as to mutually define a concentric airflow path which surrounds the injector port to thereby prevent the discharge of liquid fuel from coming into contact with the hot surface of the injector shroud at the point of fuel injection.

By still another aspect of this invention, the body portion of the fuel injector has disposed therin in concentric relationship therewith a protective sleeve which, together with the injector body, defines an annular stagnant space which insulates the internal fuel-carrying sleeve from the higher temperatures of the fuel injector body.

By yet another aspect of this invention the injector element is fabricated with the air shroud portion thereof being cast integrally with the internal tip body to thereby eliminate the mechanical problems inherent with brazed or welded joints.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

FIG. 1 is an axial cross-sectional view of an exemplary gas turbine combustion apparatus embodying the present invention.

FIG. 2 is an enlarged portion thereof showing the carburetion apparatus of the present invention.

FIG. 3 is a partial cross-sectional view thereof taken along line 3—3 of FIG. 2.

FIG. 4 is a view thereof as seen along line 4—4 of FIG. 2.

FIG. 5 is a partial cross-sectional view thereof as seen along line 5—5 of FIG. 2.

FIG. 6 is a partial axial cross-sectional view of the injector and tube portion of the present invention.

FIG. 7 is a partial cross-sectional view of the tip portion of the injector.

FIG. 8 is a sectional view thereof as seen along lines 8—8 of FIG. 7.

FIG. 9 is a top axial view of the injector as seen in FIG. 6.

FIG. 10 is an end view of the injector as seen along line 10—10 of FIG. 6.

DESCRIPTION OF THE PREFERRED EMBODIMENT

Referring now to the drawings, and particularly to FIG. 1, the invention is shown generaly at 10 as applied to a continuous-burning combustion apparatus 11 of the type suitable for use in a gas turbine engine and comprising a hollow body 12 defining a combustion chamber 13 therein. The hollow body 12 is generally annular in form and is comprised of an outer liner 14, an inner liner 16 and a domed end 17. It should be understood, however, that this invention is not limited to such an annular configuration and may be employed with equal effectiveness in combustion-type apparatus of the well-known cylindrical can or cannular type. In the present annular configuration, the domed end 17 of the hollow body 12 is formed with a plurality of circumferentially spaced openings 18, each having disposed therein an improved fuel injection apparatus 10 of the present invention for the delivery of an air/fuel mixture into the combustion chamber 13.

The hollow body 12 may be enclosed by a suitable shell 19 which together with the liners 14 and 16 define passages 21 and 22, respectively, which are adapted to deliver a flow of pressurized air from a suitable source such as a compressor 23 and diffuser 25, into the combustion chamber 13 through suitable apertures or louvers 24 for cooling of the hollow body 12 and dilution of the gaseous products of combustion in a manner well known in the art. The upstream extension 26 of the hollow body 12 is adapted to function as a flow splitter, dividing the pressurized air delivered from the compressor 23 between the passages 21 and 22 and an upstream end opening 27 of the extension 26. The opening 27 fluidly communicates with the improved fuel injection apparatus 10 of the present invention to provide the required air for carburetion.

Delivery of fuel to the fuel injection apparatus 10 is provided by way of a hollow fuel tube 28 which is connected to the outer shell 19 by means of a mounting pad 29. The fuel tube 28, which is curved so as to fit within the opening 27, comprises a piece of hollow tubing having a fuel passageway 31 (FIG. 6) formed therein which supplies liquid fuel to the fuel injector tip 32 for subsequent atomization by the carburetor device of the present invention.

The tip 32 and the associated fuel tube 28 should not be confused with the conventional atomizing nozzles in which fuel is delivered to a combustion chamber as a highly atomized spray. Such conventional atomizing nozzles normally include small passageways of decreasing area by means of which fuel is accelerated, pressurized and therafter atomized as it expands from the nozzle outlet or throat. In other applications, such atomizing nozzles may include vortex flow paths which are used to accelerate the fuel which is atomized by a process of expansion from the outlet to such flow path. In contrast with this type of atomizing nozzle, Applicants' device includes the use of a low pressure fuel delivery tube 28 which delivers fuel to an injector tip 32, the injector tip having a plurality of ports 33 formed therein for carrying the low pressure fluid stream to the outer periphery of the injector to be carbureted with the air supply in a manner peculiar to the present invention. Generally, a low pressure fuel injection system is defined as one wherein the total exit orifice area (ports) is equal to or greater than the flow area of the fuel supply tube. The specific structure of the fuel tube 28 and fuel injector tip 32 will be more fully described hereinafter.

Referring now to FIGS. 2 through 5, the fuel injector apparatus 10 of the present invention shown to include in serial interrelationship, an air blast disc 34, a venturi shroud 36 and a secondary swirler 37. Briefly, carburetion of the fuel from the injector tip 32 for subsequent introduction into the combustor 13, is accomplished by initially directing a plurality of high pressure air jets onto the low pressure fuel stream emanating from the injector ports 33 to partly break up the liquid particles of fuel and create a counterclockwise swirling of the atomized mixture within the venturi shroud 36. A portion of the fuel wets the venturi walls. The swirling mixture, which also has an axial component of velocity, tends to flow out of the downstream lip 39 of the venturi shroud 36 where it interacts with the counterrotational or clockwise rotating swirl of air being delivered by the secondary swirler 37. The interaction between the two airstreams provides a region of high shear forces which acts to finely atomize fuel swirling out of the venturi shroud 36 so that it is ready for ignition within the combustor 13.

As seen in FIGS. 2 and 4, the air blast disc 34 is generally symmetrical about the axis on which the injector tip 32 projects, and includes in its upstream end a frusto-conical opening 41 which tapers down to a circular hole 42 for receiving the fuel injector tip 32 therein. Such a tapered opening 41 facilitates the assembly of the fuel injector apparatus by allowing the fuel tube 28 and injector tip 32 assembly to be blindly inserted within the disc from the upstream end thereof. In the assembled position, the injector tip 32 fits loosely within the hole 42 so as to allow relative axial movement as may be caused by mechanical and thermal changes. The air blast disc 34 is held in place by way of a slip joint 43 formed between the venturi flange 45 and an axially spaced bracket 44 attached thereto. Such an annular slip joint 43 provides positive positioning of the disc 34 but allows for relative movement between the disc and the surrounding structure such as may be caused by thermal growth and stacking tolerances.

Formed in the disc 34 is a plurality of passageways 38 for the conduction of high pressure air from the combustor as indicated by the arrows in FIG. 2. The passageways 38 are each defined in part by an inlet opening 47 formed in a bevel face 48 of the disc 34, and on the other end an elongate discharge hole 49 formed in the flat downstream face 51 of the disc. The axes of the passageways 38 form an angle $\alpha$ with the axis of the fuel injector apparatus and, as can be seen in FIG. 2, the angle $\alpha$ is such that the introduction of air into the combustor by way of the passageways 38 is in a generally radial direction as opposed to the axial direction of the prior art. The angle $\alpha$ may vary from 35° to 85° but is preferably designed to provide an optimum distribution of fuel on the veturi and in the free stream. Although the passageways are depicted as bein round, other shapes may be used depending on the installation.

As can be seen in FIGS. 4 and 5, the alignment of the passageways 38 is generally radial in direction, but is slightly offset from the center of the disc so as to be directed onto the outer periphery of the fuel injector tip 32. More specifically, half of the passageways 38a are disposed and aligned such that the air flowing from each of the passageways is introduced directly on the discharge end of one of the fuel injector nozzle holes 33. The other half of the passageways 38b, which are alternately disposed between the aforesaid passageways 38a, are disposed and aligned such that the air discharged therefrom is introduced against the periphery of the fuel injector tip 32 at points between the fuel injector holes 33. In other words, assuming an assembly of the nozzle and disc in FIGS. 4 and 8, fuel will be discharged from ports 33 at points 90° apart, including the port 33a which is aligned in the upward direction. Referring to FIG. 4, we see that the passageway 38a is directed on the fuel injector tip 32 at a point directly at the top periphery thereof to directly coincide with the discharge end of the port 33a (FIG. 8). In this way any flow of low pressure fuel that emanates from port 33a is immediately blasted by a direct flow of high pressure air to prevent any carbonization of the fuel on the injector tip 32 at that point. Referring now to the adjacent passageway 38b in FIG. 4, it will be seen that this passageway is disposed and aligned in a position so as to direct the flow of air at a position intermediate the fuel injector ports 33a and 33d, respectively, on the periphery of the nozzle. The purpose served by the passageway 38b is to change the direction of the fuel which has been blasted by the air from passageway 38a so as to further atomize it and to swirl it within the venturi shroud 36. It will thus be seen then that the alignment of the passageways is such that there is an alternate distribution of direct blast (38a passageways) and supplementing blasts (38b passageways) to jointly provide a concentrated blast of high pressure air to bring about an initial atomization of the low pressure fuel stream without allowing the carbonization of fuel on the periphery of the injector tip 32. The individual jets of air coalesce and form a swirling vortex which distributes a portion of the fuel on the venturi and another portion into the free stream.

The venturi shroud 36 converges from the flange portion 45 thereof to a point of minimum radius or a throat 52, and then diverges slightly to the downstream lip 39 to define an axial flow path through which the fuel/air mixture may be counterrotationally swirled into the active zone of the secondary swirler 37. The venturi shroud 36 has formed thereon, on the downstream side thereof, a flat face 53 for attachment to the forward wall 54 of the secondary swirler 37 for support therefrom. A uniform annulus is formed between the venturi lip 39 and the secondary swirler exit lip 58.

The secondary swirler 37 includes, in addition to the forward wall 53, an axially spaced aft wall 55 and a plurality of counterrotatable radial flow vanes 56 disposed between the walls 53 and 55 so as to cause the flow of high pressure air in the direction indicated by the arrows in FIG. 2. Support for the secondary swirler 37 is provided by an annular flange 57 extending rearwardly thereof and attached to the domed end 17 by way of welding or the like. The secondary exit lip 58 disposed radially inwardly from the first annular flange 57 has attached thereto a flared trumpet outlet 59 which extends into the combustion chamber 13 as shown in FIGS. 1 and 2.

Turning attention now specifically to the fuel delivery portion of the present invention, the details of the fuel injector tip 32 and the fuel tube 28 are more clearly shown in FIGS. 6 through 10. As will be seen in FIG. 6, the fuel tube 28 comprises an outer tube 61 and an inner tube 62 radially positioned therein by way of a spacer wire 63 so as to provide an insulating space 64 between the outer and inner walls, 61 and 62, respectively. It will be recognized that by the use of the spacer wire 63, a controlled air gap is maintained between the inner and outer tubes without the use of any fixed attachment therebetween. In this way the inner tube 62 is insulated from the high temperatures of the outer tube 61 so that the temperature of the inside wall of the inner tube 62 is maintained below the fuel-gumming temperature. The particular spacing required between the outer and inner walls is dependent on the operational parameters of the engine and, in particular, the operating temperatures to which the outer wall 61 is exposed.

It will be recognized that the insulating space 64 is continuous throughout the length of the outer and inner tube combination, and at the downstream end thereof there is an enlargement 66, brought about by a removal of a portion of the outer wall 61, which facilitates the attachment of the fuel tube 28 to the fuel injector tip 32 while maintaining an insulation relationship between the fuel and the outer wall. This is accomplished by way of a protective sleeve 67 interconnecting the tube 28 and the injector tip 32.

The protective sleeve 67 comprises a first cylindrical portion 68 and a second cylindrical portion 69 integrally attached thereto at a position downstream thereof, with the second cylindrical portion having a smaller diameter than that of the first cylindrical portion. The first cylindrical portion 68 is adapted to be placed within the enlargement 66 such that its inner diameter fits over the outer diameter of the inner tube 62 in a close-fit relationship, and that its outer diameter is maintained in spaced relationship from the outer tube 61 so as to preserve the insulating relationship. The second cylindrical portion 69 is adapted to fit within the body 71 of the fuel injector tip 32 such that the outer diameter of the second cylindrical portion is disposed within the inner diameter 72 of the body 71. Positive axial positioning between the protective sleeve 67 and the body 71 is provided by a mating of the respective faces to form the radially extending interface 73 therebetween. In this way the fuel tube 28 and the fuel injector tip 32 are mated together at 75 and the protective sleeve 67 at its one end engages the inner tube 62, and extends at its other end into the fuel injector inner diameter 72.

It will be recognized that the inner diameter 72 of the body 71 is substantially constant throughout its length, whereas the outer diameter of the second cylindrical portion 69 decreases at a point 74 to provide an annular space 76 between the second cylindrical portion 69 and the body 71. This space 76, which is vented to the fuel flow stream by way of the passage 77, provides an insulating medium between the gas stream flow path 78 an the body 71 which will tend to be heated by way of the relatively hot airstream flow path 79 outside thereof.

Referring now to FIGS. 6 through 8, the body 71 of the fuel injector tip 32 is seen to be a generally cylindrically shaped element having a closed, generally bulbous downstream end 81. The inner diameter of the body 71 which tightly receives the protective sleeve 67 therein to define the fuel flow path 78, narrows to a small downstream chamber 82 which, in turn, fluidly communicates with the outer periphery of the injector tip 32 by way of the plurality of ports 33a through 33d formed in the body, the length of each of the ports 33 being extended by way of a cylindrical exit flow tube 83 extending substantially radially outwardly from the body. The number of flow tubes 83 and associated ports 33 is shown as being four; however, it will be recognized that this number may be increased or decreased to meet the demands or particular operating characteristics desired for a given set of operational parameters. Further, although the axes of the holes 33 are shown as extending at an angle $\theta$ with the radial plane, it will be understood that the angle may be varied so long as the axis is in the generaly radial direction. It has been found that for desired performance the magnitude of the angle $\theta$ should preferably not exceed 55°. The area of the throat of the venturi 52 should be so selected as to prevent hot gas recirculation loads to the fuel injector face.

Surrounding the nozzle injector 71 in concentric relationship therewith, is a shroud 84. The shroud 84 is generally cylindrical in form and is secured to and supported by the injector body 71 by a plurality of substantially radially extending ribs 86. Although the number of ribs 86 in the preferred embodiment is shown to be four, it will be recognized that the number may be varied to accommodate mechanical design requirements and preferences. At the rear or upstream end of the shroud 84 is a flared portion 87 which, together with the internal body structure 71, defines the inlet flow passage 88 to the airstream flow path 79. Proximate the downstream end of the shroud 84 there is a plurality of air outlet passages 89 formed therein, the location and size of each of the air outlet passages being such as to surround one of the flow tubes 83 so as to mutually define an annular air passageway 91 therebetween. The purpose of the annular air passageway 91 is to conduct the flow of high pressure air from the airstream flow path 79 to the outer periphery of the shroud 84 and, in so doing to completely surround the flow of fuel from the flow tube 83 to thereby insulate the gas stream flow from the relatively hot shroud surface which would otherwise cause carbonization of the fuel and a buildup thereof on the shroud surface.

As will be seen in FIGS. 7 through 9, the shroud structure 84 has formed therein, in connection with each of the air outlet passages 89, a slit 92 extending from the air outlet passage 89 upstream to the other end thereof. This plurality of slits 92 is provided in recognition of the fact that the temperatures of the injector body 71 and the shroud 84 will differ and will therefore cause relative thermal growth therebetween. The slits 92 therefore allow the larger growth of the shroud 84 without causing harmful stresses therein.

At the downstream end of the shroud 84, there is an end wall 93 having an aperture 94 centrally formed therein to conduct the flow of high pressure air from the airstream flow path 79 as indicated by the arrows in FIG. 6. This high pressure airflow tends to form an air spray pattern in the downstream direction so as to further shield the downstream end of the tip from the combustion zone.

In operation, high pressure air is delivered from the compressor 23, through the diffuser 25, to the opening 27, where a portion of the air enters the primary swirler or air blast disc 34 and a portion thereof is supplied to the secondary swirler 37 as shown in FIG. 1. At the same time, a passage of air flows to the frustoconical opening 41 and enters the fuel injector by way of the inlet flow passage 88. From there, the air flows along the flow path 79 and is discharged in a concentric manner with respect to the flow tube 83 so as to insulate the flow tube 83 and the fuel conducted therein from the relatively hot surfaces of the shroud 84 to thereby prevent the buildup of carbon on the flow tube. Further, provision is made upstream of the fuel dispersion point for the insulation of the fuel flow stream from the hot areas of operation. For example, within the fuel tube 28, an insulating space 64 and an enlargement space 66 is provided between the outer tube 61 and the inner, fluid-carrying tube 62 so as to prevent the heating up of fuel within the fuel passageway 31. The protective sleeve first cylindrical portion 68 is insulated by surrounding space 66 whereas the downstream second cylindrical portion is isolated by way of an annular passageway 76 which extends to the downstream chamber 82 from which the fuel is discharged to the holes 33 as described hereinbefore.

Returning now to the flow of air to the opening 27, a portion thereof enters the plurality of inlet openings 47 and passes substantially radially along the passageways 38 to be discharged from the elongate discharge hole 49 in a direction shown by FIGS. 2 and 4. As will be ssen, the high pressure flow of air is introduced directly on the fuel flow streams as they are discharged from the plurality of ports 33 to cause an immediate dispersion and atomization thereof with a portion of the resulting fuel/air mixture traveling in the axial downstream direction and a greater portion thereof being swirled in a counterclockwise direction within the venturi shroud 36. The swirling mixture then is discharged from the downstream lip 39 of the venturi where it interacts with the airstream flow from the secondary swirler 37, with the secondary flow being in the opposite, or clockwise direction to further atomize the fuel/air mixture prior to its entering the combustor 13.

What is claimed is:

1. An improved fuel injector of the type attached to a fuel supply for receiving fuel and discharging it into an airstream for carburetion thereof, wherein the improvement comprises:
   a. a hollow body attachable at its one end to a fuel supply line and having at its other end a flow tube extending from said body, said flow tube having a hole formed therein for discharging fuel from said body; and b. a shroud formed around the outer side of said body to form a cavity between said shroud and said body, said shroud comprising a cylindrical portion and a flared portion extending radially outwardly from said cylindrical portion to define an air inlet to said cavity for receiving an uncarbureted air supply, and said cavity having an axial air outlet at its downstream end for discharging a portion of the uncarbureted air in a substantially axial direction and an outlet aperture through which said flow tube extends and through which air is discharged in surrounding relationship with said flow tube.

2. The improved fuel injector as set forth in claim 1 wherein said hollow body and said shroud are substantially cylindrical in form and relatively concentrically disposed.

3. The improved fuel injector as set forth in claim 1 wherein said hollow body has a plurality of flow tubes extending radially outwardly therefrom and said shroud has a plurality of associated apertures.

4. The improved fuel injector as set forth in claim 3 wherein said plurality of flow tubes are equally spaced around the circumference of said body.

5. The improved fuel injector as set forth in claim 1 wherein said shroud is connected to said body by a plurality of interconnecting ribs.

6. The improved fuel injector as set forth in claim 2 wherein said shroud is connected to said body by a plurality of longitudinally extending ribs.

7. The improved fuel injector as set forth in claim 3 wherein said shroud is connected to said body by a plurality of interconnecting ribs circumferentially disposed intermediate said plurality of flow tubes.

8. The improved fuel injector as set forth in claim 1 wherein the outer surface of said shroud is substantially flush with the outer end of said flow tube.

9. The improved fuel injector as set forth in claim 1 and including a slot formed in said shroud and extending between said one end and said aperture.

10. The improved fuel injector as set forth in claim 2 and including at least one axially extending slot formed in said shroud.

11. The improved fuel injector as set forth in claim 10 wherein said slot extends between said one end and said aperture.

12. An improved fuel injector of the type attached to a fuel supply for receiving fuel and discharging it into an airstream for carburetion thereof, wherein the improvement comprises:
  a. a hollow body attachable at its one end to a fuel supply line and having at its other end a fuel discharge port;
  b. a shroud formed around the outer side of said body to form a cavity between said body and said shroud for the conduct of relatively hot air to be used for carburetion;
  c. a sleeve disposed concentrically within said body to define an annulus between said sleeve and said body; and
  d. a gap associated with said sleeve to fluidly connect said annulus with said fuel supply line to allow the entry of fuel into said annulus for the purpose of decomposing carbon deposits which may form therein.

13. An improved fuel injector as set forth in claim 12 wherein said gap is formed between the end of said sleeve and the internal wall of said hollow body.

14. An improved fuel injector as set forth in claim 12 wherein a portion of said sleeve is disposed in close fit relationship with the internal wall of said hollow body.

* * * * *